Sept. 30, 1969   JAMES E. WEBB   3,470,342
ADMINISTRATOR OF THE NATIONAL AERONAUTICS
AND SPACE ADMINISTRATION
ELECTRICAL SWITCHING DEVICE
Filed Jan. 26, 1968   2 Sheets-Sheet 1

INVENTOR.
CHARLES W. EDMAN
BY
J. H. Warden
G. T. McCoy
ATTORNEYS.

Sept. 30, 1969 JAMES E. WEBB 3,470,342
ADMINISTRATOR OF THE NATIONAL AERONAUTICS
AND SPACE ADMINISTRATION
ELECTRICAL SWITCHING DEVICE
Filed Jan. 26, 1968 2 Sheets-Sheet 2

INVENTOR.
CHARLES W. EDMAN
BY
ATTORNEYS.

United States Patent Office 3,470,342
Patented Sept. 30, 1969

3,470,342
ELECTRICAL SWITCHING DEVICE
James E. Webb, Administrator of the National Aeronautics and Space Administration, with respect to an invention of Charles W. Edman, Sylmar, Calif.
Filed Jan. 26, 1968, Ser. No. 700,987
Int. Cl. H01h 29/00, 35/02, 29/02
U.S. Cl. 200—152
10 Claims

ABSTRACT OF THE DISCLOSURE

An electrically conductive liquid is confined within a square loop of deformable nonconductive tubing having electrical terminals on two opposite corners connected to the opposite poles of a battery, and terminals at the other two corners connected to an output circuit. Simultaneously displacing the liquid in one pair of opposite sides of the loop energizes the circuit with a given polarity. Reversing the situation by displacing the liquid in the other pair, reverses the polarity.

The device is also usable as a leveling switch by forming a ridge in each nonconductive side equal in height to the level of the conductive liquid when the device is horizontally level. When not level, two adjacent corners are electrically connected to actuate a leveling device.

Origin of the invention

The invention described herein was made in the performance of work under a NASA contract and is subject to the provisions of Section 305 of the National Aeronautics and Space Act of 1958, Public Law 85–568 (72. Stat. 435; 42 USC 2457).

Background of invention

This invention relates to an electrical switching device which is particularly useful as a polarity reversal switch or a leveling switch.

In various electrical applications it is desirable to change quickly the output polarity of a direct current power source. For example in spot welding units this is frequently necessary. To physically change the connections to reverse, the polarity is naturally quite time consuming and inconvenient. Also, the problem is of course multiplied in large welding operations employing a considerable number of welding stations.

Other known polarity switching methods or devices are expensive silicone-control rectifier bridge circuits and double-pole-double-throw switches which may have varying resistance.

It is desirable that a polarity reversal switch be available which does not have the shortcomings of the prior devices. More specifically, the switch should be relatively inexpensive and should be operable quickly and easily to perform the necessary switching function. It is also particularly important that the switch be able to handle high currents with relatively low resistance for such operations as welding and other high current applications.

Summary of the invention

In accordance with the invention, there is provided a tubular passage including a plurality of conductive segments spaced by nonconductive tubular segments. The passage is preferably arranged in a closed square loop with the conductive segments being located at the corners of the loop. A conductive liquid such as mercury, doped with silver, partially fills the tubular passage to provide a conductive path between the conductive segments when the loop is horizontally oriented.

To utilize such a structure as a polarity reversal switch, such as in a welding operation, a DC power source is connected across opposing diagonal conductive segments, and the welding output circuit is connected across the other two opposing conductive segments. By making the nonconductive segments of deformable material, a rod may be used to extend across the loop and engage the underside of two opposite nonconductive segments to force the bottom walls of those two segments upwardly to interrupt the conductive path provided by the liquid conductor. This provides a complete circuit of a given polarity. Utilizing the rod to interrupt the conductive path of the other two opposite sides of the loop, reverses the polarity.

The closed loop passage of alternate conductive and nonconductive segments may also be employed as a leveling device suitable, for example, to level an unmanned space craft landing on the moon or other planets. By forming an upwardly extending ridge in the lower wall of the nonconductive tubular segments and making the height of the ridge equal to the depth of the conductive liquid, none of the conductive segments are electrically connected by the conductive liquid when the device is horizontally level. However, if the device is tilted or becomes unlevel, the liquid flows over the ridge on the low side, thus electrically connecting the two adjacent conductive segments. By connecting these segments to a leveling device, the tubular loop may be automatically leveled.

Detailed description of the invention

For a more thorough understanding of the invention, reference may be had to the following detailed description and drawings, in which.

Figure 1:
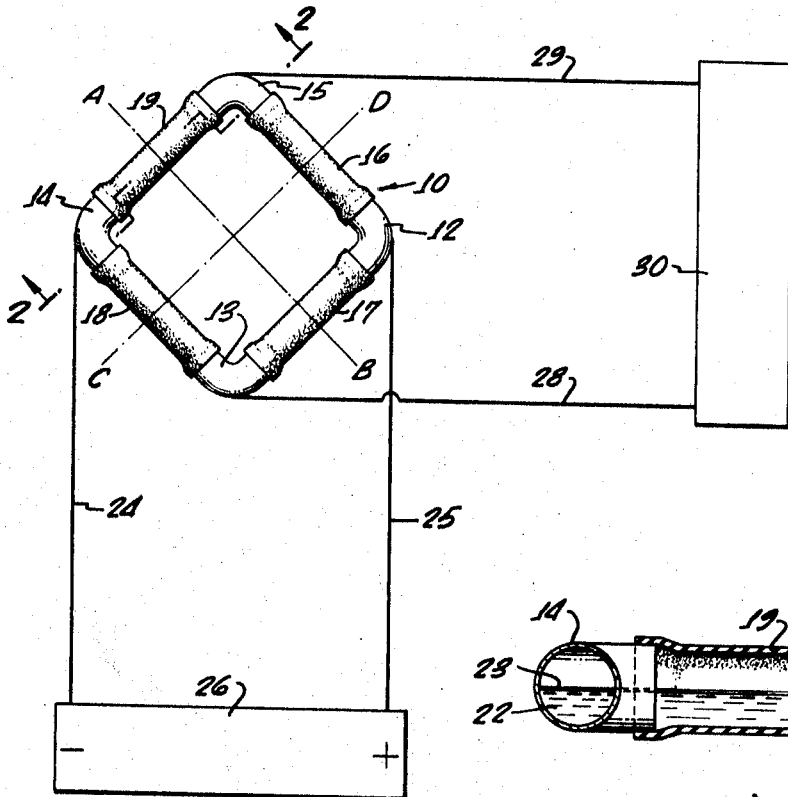
FIG. 1 is a plan view of the switch of the invention shown schematically connected to a power source and an output circuit.
Figure 2:
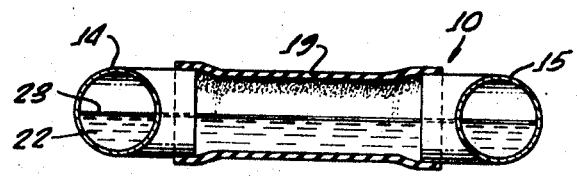
FIG. 2 is a cross-sectional view of one leg of the switch of FIG. 1 along line 2—2.
Figure 3:
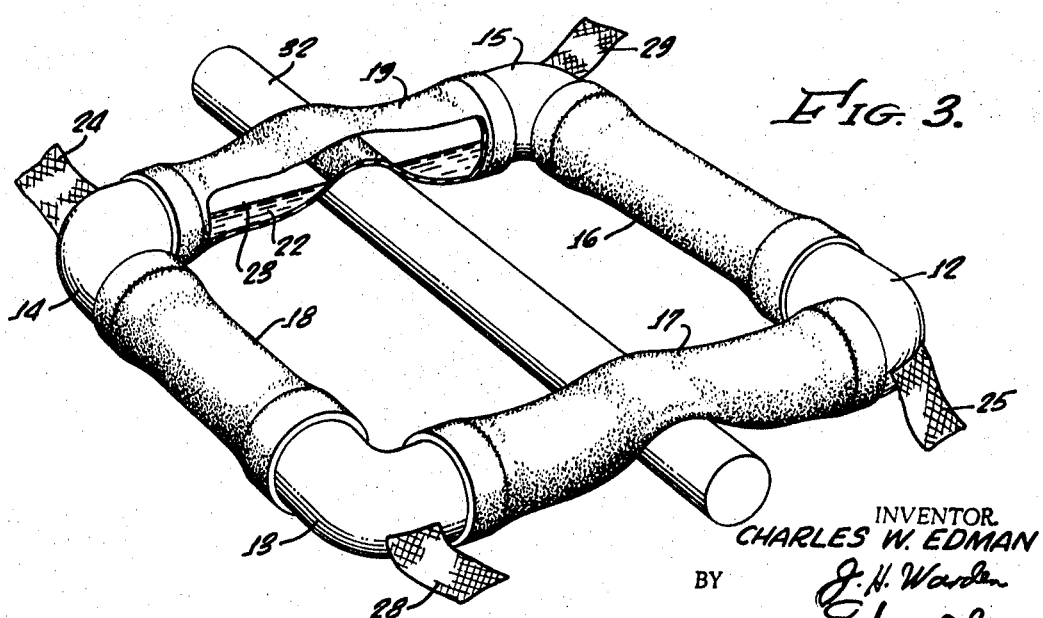
FIG. 3 is a perspective view of the switch together with a rod used to interrupt two of the conductive paths within the switch.

Referring first to FIGS. 1–3, a preferred embodiment of the switch is illustrated as including a tube defining fluid passage 10 arranged in the form of a closed square loop. The passage 10 is provided with alternate conductive and nonconductive segments by being formed of four tubular elbows 12, 13, 14 and 15, made of copper or other electrically conductive material, and connected by four straight tubes 16, 17, 18 and 19 made of resiliently deformable nonconductive material, such as rubber or plastic. As shown, the ends of the nonconductive tubes 16–19 are positioned over the ends of the conductive elbows to provide sealed connections.

The tubular passage 10 is about half filled with a quantity of electrically conductive liquid 22 as shown in FIGS. 2 and 3. This liquid is preferably mercury mixed with a small quantity of silver to reduce its electrical resistance. In addition, a small quantity of distilled water is included in the message 10 to form a layer on the upper surface of the liquid mercury to prevent oxidation of the mercury by the air within the passage. The copper elbows 12–15 are preferably externally coated with nickel to prevent liquid mercury from bleeding through the copper.

When the switch is horizontally oriented, as shown in FIG. 2, the conductive liquid 22 extends around the entire loop of the passage 10 and electrically connects the corner conductive elbows or segments 12–15. By squeezing one of the resilient nonconductive tubes 16–19, the conductive liquid 22 in that area of the tube being squeezed is displaced so that the connection between the two corners on the ends of the tube is broken. Thus, a switching function is performed.

In FIG. 1, the passage 10 is connected to perform a polarity switching function. The diagonally opposite conductive terminals or corners 12 and 14 are solidly connected by conductors 24 and 25 to a direct current power source 26. The other diagonally opposite corners 13 and 15 are solidly connected by conductive leads 28 and 29 to an output circuit 30, such as a welding station. When the conductive path within the passage 10 remains unbroken, the conductors 24 leading to the power source are connected so that the power source is shorted. Interrupting the liquid conductive path 22 in opposite loop sides of the passage connects the circuit so that the welding station 30 is energized.

Positioning a rod 32, as seen in FIG. 3, under the opposite tubes 17 and 19, which is on the axis A–B as shown in FIG. 1, raises the lower walls of the tubes so that gravity causes the conductive liquid to separate and interrupt the conductive path. Consequently, assuming current flow from the positive terminal to the negative terminal of the power source 26, the current flow is through the conductor 25, the elbow 12, the liquid mercury in the tube 16, the conductive elbow 15, the electrical lead 29, the welding station 30, the lead 28, the elbow 13, the conductive liquid in the tube 18, the elbow 14, and the conductor 25 to the negative terminal of the power source 26.

Removing the rod 32 from the axis A–B causes the resilient tubes 17 and 19 to assume their original shape so that gravity causes the conductive fluid once more to complete the electrical connection between their adjacent corners or elbows. By positioning the rod along the axis C–D, shown in FIG. 1, to interrupt by gravity the conductive liquid in tubes 16 and 18, the circuit through the welding station 30 is once more complete; however, the polarity is reversed from that of interrupting along the A–B axis.

Thus, in this simple manner, the polarity of an electrical operation such as a welding station may be quickly switched. The conductive liquid 22 can carry high current flow with very low electrical resistance. Also, the absence of electrical contacts eliminates the contact wear problem arising with conventional contact type switching arrangements. Also, the apparatus is relatively inexpensive.

Figure 5:
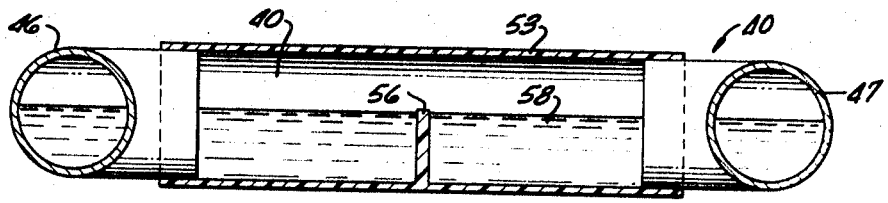
FIG. 5 is a cross-sectional view of one leg of the switch of FIG. 4 taken along line 5—5; and, FIG. 6 is a perspective, partially sectionalized view of the switch of FIG. 4 in an unlevel position.
Figure 4:
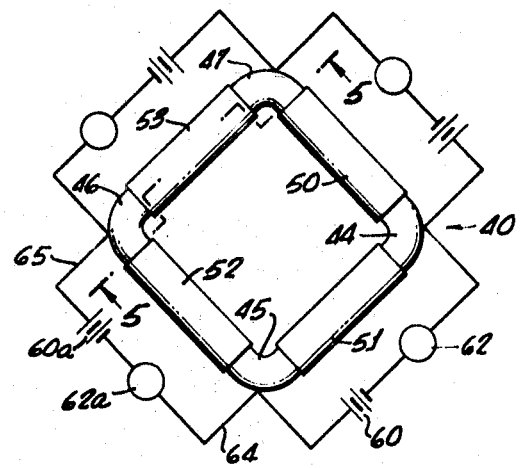
FIG. 4 is a plan view of a modification of the switch of FIG. 1 schematically shown being used as a leveling switch.
Figure 6:
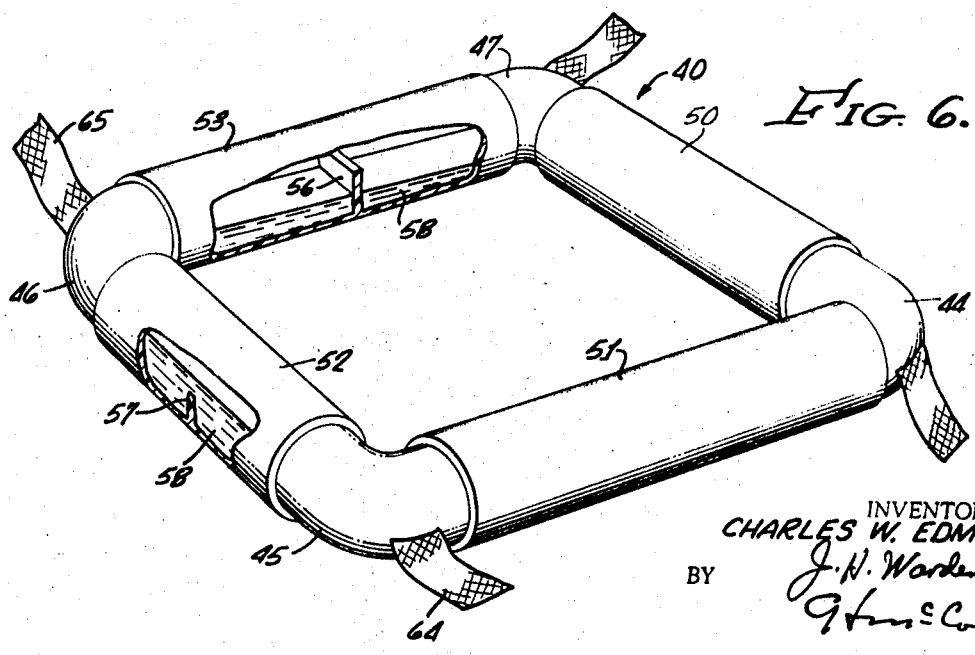

Referring now to a modification of the invention illustrated in FIGS. 4–6, there is shown a tube defining liquid passage 40 arranged in the form of a closed square loop and being formed of alternate conductive and nonconductive segments. More specifically, four conductive elbows 44, 45, 46 and 47 are positioned at the corners of the loop and connected by four nonconductive tubes 50, 51, 52 and 53.

As illustrated in FIG. 5, there is formed in the nonconductive tube 53 an interrupting dam or ridge 56 which extends upwardly from the bottom wall of the conductive tube preferably to a height of about one-half the diameter of the tube. A similar ridge 57 is provided for the tube 52, as seen in FIG. 6, and for the other tubes 50 and 51 although not shown. Within the passage 40, there is positioned a conductive liquid 58 to a horizontal depth equal in height to that of the ridge; or, in other words, the passage 40 is about half filled.

With such an arrangement, the conductive liquid 58 is interrupted by the ridges 56 when the passage is completely level, as viewed in FIG. 5, so that none of the conductive corners 44–47 are electrically connected. However, when the passage becomes unlevel, as viewed in FIG. 6, the liquid 58 in the low tube 52 of the passage 40 flows over the ridge 57 in the tube 52 so that the two corners 45 and 46 adjoining the tube 52 are electrically connected. By connecting the corner elbows 45 and 46 to a power source 60a and a leveling device 62a with conductors 64 and 65, a circuit is thus completed when the conductive path through the low side of the passage 40 is completed. The leveling device 62a is arranged to raise the side of the passage 40 including the tube 52 until the circuit is once more interrupted by the ridge 57 when the tube 52 is level.

Each of the other sides of the passage 40 are similarly connected to a power source 60 and a leveling device 62 so that each side can be automatically raised when it is too low. The leveling switch may be used, for example, for leveling an unmanned space craft landing on another planet or the moon.

While only two embodiments of the invention have been illustrated and described, it will be appreciated that other variations and modifications will now become apparent. For example, the power sources and leveling devices in the embodiment of FIGS. 4–6 may be connected in various ways to provide the desired result. Also, the number of conductive and nonconductive segments in that embodiment may be varied as desired. In both embodiments the shape of the loop may be varied. Accordingly, it is intended that all such variations and modifications that fall within the true spirit and scope of the invention be included in the appended claims.

What is claimed is:

1. An electrical switching device comprising:
   means defining a tubular passage formed in a closed loop and defined by four spaced conductive segments separated by four alternately spaced nonconductive segments;
   a conductive liquid partially filling said passage to form a conductive path between the conductive segments when the passage is horizontally oriented; and
   means cooperating with said nonconductive segments for interrupting the conductive liquid path between said conductive segments to thereby perform switching functions.

2. The switching device of claim 1, including:
   means for connecting a direct current power source across two opposite conductive segments;
   means for connecting an output circuit across the other two conductive segments; and
   said interrupting means include means for selectively interrupting the liquid path in opposite pairs of the conductive tubes to determine the polarity of the current flow through the output circuit.

3. The switching device of claim 2, wherein said nonconductive tubes are made of flexible material, and the circuit interrupting means includes means for deforming the flexible tubes to interrupt the conductive path.

4. The switching device of claim 3, wherein said interrupting means includes a rod extending across the tubular passage to engage the lower surface of opposite nonconductive tubes to deform the material upwardly and thereby interrupt the conductive path in those two deformed tubes.

5. The switching device of claim 1, wherein the interrupting means includes means forming an upwardly extending ridge centrally located in each of the nonconductive tubes, the height of the ridge being equal to the depth of the conductive liquid in the passage when horizontally oriented, whereby none of the conductive segments are electrically connected through the conductive liquid when the device is horizontally oriented.

6. The switching device of claim 5, including means for connecting each adjacent pair of conductive segments to a source of power and a device for levelling the tubular passage when the conductive path through a particular nonconductive tube is completed.

7. The device of claim 5, wherein the passage is at least about half filled with liquid.

8. An electrical switching device according to claim 1 wherein the conductive liquid partially filling the passage to form a conductive path between the conductive segments when the passage is horizontally oriented comprises liquid mercury mixed with a small quantity of silver to reduce electrical resistance.

9. The switching device of claim 8, including a quantity of distilled water in said passage for forming a layer covering the mercury to prevent oxidation of the mercury by the air in the passage.

10. An electrical switching device comprising:
  means having an endless passage disposed in a substantially common plane, said means having successive segments exposed to the passage which are alternately of electrically conductive and nonconductive material;
  a fluid electrical conductor partially filling the passage and establishing a conductive path between the conductive segments; and
  means operatively associated with said means for interrupting said conductive path at a nonconductive segment to perform switching functions.

References Cited

UNITED STATES PATENTS

| 2,697,155 | 12/1954 | Brown et al. | 200—152 |
| 2,823,367 | 2/1958 | Huron | 200—61.47 X |
| 3,177,327 | 4/1965 | Weiss. | |

ROBERT K. SCHAEFER, Primary Examiner

H. J. HOHAUSER, Assistant Examiner

U.S. Cl. X.R.

200—61.47